July 29, 1930.  C. W. LEGUILLON  1,771,496
APPARATUS FOR DIVIDING A MASS OF DEFORMABLE MATERIAL
Filed Oct. 5, 1928
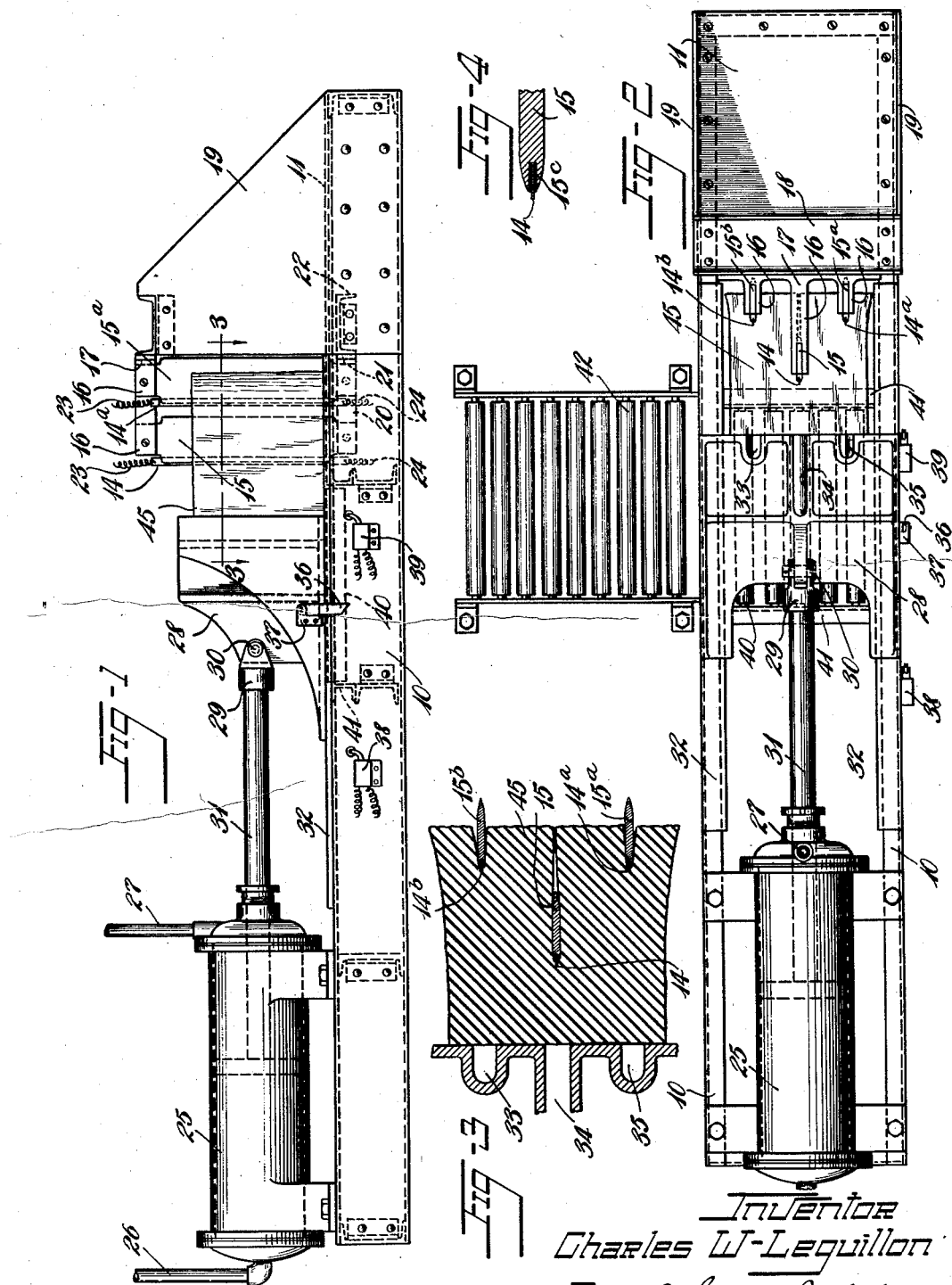

Patented July 29, 1930

1,771,496

UNITED STATES PATENT OFFICE

CHARLES W. LEGUILLON, OF AKRON, OHIO, ASSIGNOR TO THE B. F. GOODRICH COMPANY, OF NEW YORK, N. Y., A CORPORATION OF NEW YORK

APPARATUS FOR DIVIDING A MASS OF DEFORMABLE MATERIAL

Application filed October 5, 1928. Serial No. 310,584.

The present invention relates to apparatus for cutting blocks of material and it is of especial utility in connection with the cutting of "bales" of crude rubber, after removal of the binding means therefrom, into slabs of a size suitable for the subsequent mastication of the rubber on a rubber mill.

Among the chief objects of my invention are to provide in an improved manner for simultaneously cutting a block of material such as crude rubber in a plurality of cutting planes and especially for so cutting a block of rubber into slabs of approximately uniform size suitable for feeding directly to a rubber mill; to provide in an improved manner for taking advantage of the property which rubber possesses of softening under heat for simultaneously separating a bale of rubber into a plurality of parts; to provide against excessive binding of the cut material against the sides of the knife; and to prevent the cut faces of heat-plastic or adhesive material such as raw rubber from so contacting each other after the cutting operation as to adhere to each other or fuse together.

On the accompanying drawing:

Fig. 1 is a side elevation of apparatus embodying and adapted to carry out my invention in its preferred form, a bale of rubber being shown therein in the process of being cut.

Fig. 2 is a plan view of the same.

Fig. 3 is a horizontal cross section on line 3—3 of Fig. 1.

Fig. 4 is a detail section of one of the knives.

Referring to the drawing, a supporting framework comprises frame member 10, 10 suitably braced and having a horizontal bale-supporting platform 11 mounted thereon and extending from near one end of the frame to about the middle thereof.

For cutting a bale of rubber 45 or the like while the latter is supported on the platform 11 there are provided a plurality of vertically-disposed, electrically-heated bars or knives 14, 14$^a$, 14$^b$, of ni-chrome steel or other resistant material, the said knives being disposed in staggered or echelon relationship so as to operate at any given time at different positions fore-and-aft of the bales, the knives being respectively secured in the grooved longitudinal edges of vertical knife-mounting members 15, 15$^a$, 15$^b$ of steel or the like, the latter being double convex in cross section adjacent the knife, as shown in Fig. 3. The said members 15 extend through apertures in the platform 11 and each has its upper end secured to the end of one of a plurality of knife-supporting fingers 16, 16, formed in a casting 17, the latter being secured to the side of a channel member 18 mounted in the top margins of a pair of vertically-disposed brace members 19, 19, respectively secured to the frame members 10, 10, the knives being of greater height than the bales to be cut.

The lower end of each of the knife-mounting members 15 is secured to an end of one of a plurality of supporting fingers 20, 20, formed in a casting 21 which is secured to a channel member 22 mounted on the frame members 10, 10.

The knives 14 are suitably insulated from the steel knife-mounting member 15 by layers or plates 15$^c$ of asbestos, mica, or the like, and each knife has its ends connected by insulated wires 23, 24 to a source of electric current suitable for heating the knives to the desired temperature.

For moving a bale of crude rubber or the like longitudinally of the supporting structure and for pressing it against and forcing it past the knives, a hydraulic cylinder 25 is mounted on the frame and is provided with the usual fluid inlet and outlet pipes 26, 27. A pusher head 28 is removably secured to the end of the cylinder's piston rod 31 by a clevis casting 29 and a pin 30, the latter passing through a central vertical web in the pusher head 28. The head is arranged for reciprocatory movement on a pair of longitudinal slideways 32 mounted upon the upper edges of the middle portions of the frame members 10.

The pusher head 28 has its front or work-engaging face formed with three vertical slots or grooves 33, 34, 35 positioned therein to correspond to the positions of the knives, the middle one of the slots extending more deeply into the pusher head than the others.

The arrangement is such that as the piston moves the pusher head toward the knives, the front face of the said head can move past the knives, the latter entering the respective slots in the pusher head.

For passing a current of electricity through the knives for heating the latter to a proper temperature during the advancing movement of the head and then cutting off the current when the cutting operation is nearly completed, a pivoted tripping finger 36 is carried by the pusher head 28 at one side thereof, the said finger being freely swingable in the retractive movement of the head but being locked against movement rearwardly of the head by contact with a shoulder formed upon a bracket member 37 upon which the finger is pivoted. During forward movement of the pusher head the finger 36 is adapted to operate in sequence a pair of electric switches 38, 39 for successively initiating and cutting off the flow of electric current to the knives 14, but during reverse movement of the head the finger 36 is adapted freely to swing past the switches without operating them.

Mechanism for feeding a bale of rubber into and supporting it in the path of the pusher head 28 comprises a plurality of transversely-arranged conveyor rolls 40 mounted in angle iron supports 41, 41, on cross members secured to the main frame members 10 in such manner that the tops of the conveyor rolls are slightly below the bottom edge of the pusher head. A conveyor 42 is positioned at the side of the main frame and is in alignment with the conveyor rolls 40 for carrying work to the latter from a source of supply remote therefrom.

In beginning the operation of the apparatus, the pusher head is in retracted position and there is no electric current flowing through the knives.

A bale of crude rubber or other material to be cut is now fed along the conveyor 42 to and is positioned upon the conveyor rolls 40 so as to have a side of the bale aligned with the front side of the pusher head.

The operator then operates the hydraulic cylinder 25, thus causing the pusher head to move and its front face to come into engagement with a side of the bale of rubber and to press the bale against and past the knives 14, the forward face of the advancing bale first contacting with the middle knife, and the bale of rubber being forced from the conveyor rolls 40, onto the platform 11 by the pusher head.

When the tripping finger 36 carried by the advancing pusher head contacts with the switch 38 it closes a circuit and causes a suitable current of electricity to pass through each of the knives for heating them to a temperature sufficient to soften the portions of rubber contacting therewith during movement of the bales past the knives, for materially reducing the cutting resistance of the rubber.

The double convex or shouldered construction of the knife-mounting members 15 and particularly that portion adjacent the knife edge assists in forcing apart the cut faces of the slab as the latter moves past the knife, so as to prevent any binding of the material against the knife and prevent the hot cut faces of the slabs from being pressed and fused together along the lines of cut.

When the advancing pusher head 28 approaches its most advanced position and the cutting of the bale of material has been nearly completed, the finger 36 contacts with the switch 39, breaking the electric knife-heating circuit. The operator reverses the action of the piston 31 so as to retract the pusher head from the knives and from the conveyor rolls 40, the finger 36 sliding over both of the switches 39 and 38 without actuating either of them.

The cut slabs of material, after passing the knives, are removed from the platform 11 and are delivered to the desired point of storage or the like by means of any suitable conveyor or conveying means.

The staggered arrangement of the knives permits advantage to be taken of the spreading action due to the shouldered construction of the knives for spacing apart the cut portions of the bale and preventing binding of the stock against the knife and the symmetrical form of the knife holder is conducive to a straight cut.

My invention is susceptible of modification within the scope of the appended claims.

I claim:

1. Apparatus for dividing a mass of deformable material, the said apparatus comprising a set of severing elements held in echelon relation, means for heating the same, and means for forcing the mass relatively past the said set of elements in severing relation thereto.

2. Apparatus for dividing a mass of deformable material, the said apparatus comprising a set of severing devices, and means for holding the said devices in such echelon relation that a succeeding one of the said devices does not crowd the material laterally against the device next in advance of the said succeeding device, each of said devices comprising a severing element, spreading means for holding the newly formed surfaces in spaced-apart relation by progressive contact therewith, and means adapted to heat the said severing element.

3. Apparatus for dividing a mass of deformable material, the said apparatus comprising a set of severing elements, means for holding the same in echelon relation and means for forcing the mass relatively past the said set of elements in severing relation thereto.

4. Apparatus for dividing a mass of deformable material, the said apparatus comprising a set of severing devices, means for forcing the mass relatively past the said set of devices, and means for holding the said devices in such echelon relation that a succeeding one of the devices lies entirely to the rear of the device next in advance of it.

5. Apparatus of the character described comprising an odd number of severing elements, means for holding the said elements in double echelon relation, and means for forcing a mass of material relatively past the same.

6. Apparatus of the character described comprising a severing element, means associated therewith for providing local backing support for the severing element and for spreading apart the new surfaces formed by the severing element by progressive contact therewith, and means adapted to heat the said severing element, the said backing-support means and the said severing element being associated in substantially non-heat-conductive relation to each other.

7. Apparatus of the character described comprising a set of severing elements, means for holding the same in double echelon relation, means for forcing a mass of material relatively past said elements, and means associated with each element for so widely spreading apart the divided portions of the mass that they are not forcibly crowded into contact with each other by succeeding severing elements, the echelon relation of the elements being such that a succeeding element does not crowd the material laterally against the element next in advance of the said succeeding element.

8. Apparatus of the character described comprising a severing element, means associated therewith for spreading apart the new surfaces formed by the severing element by progressive contact therewith, means for forcing a mass of material relatively past the said severing element, the last said means being formed with a recess to receive the said severing element and means adapted to heat the said severing element.

9. Apparatus of the character described comprising a severing element, means associated therewith for providing local backing support therefor and for spreading apart the new surfaces of material cut thereby, means for heating the severing element, and a heat-insulating material interposed between the severing element and the supporting and spreading means.

In witness whereof I have hereunto set my hand this 28th day of September, 1928.

CHARLES W. LEGUILLON.